United States Patent [19]

Tomiyama et al.

[11] Patent Number: 5,605,740
[45] Date of Patent: Feb. 25, 1997

[54] ACTINIC RADIATION-CURABLE COLORED COATING COMPOSITION FOR USE IN VACUUM-FORMING FILM, VACUUM-FORMING FILM AND VACUUM-FORMED PRODUCT

[75] Inventors: Takeshi Tomiyama; Shinichi Ogino; Tsutomu Maruyama; Kenji Seko, all of Hiratsuka, Japan

[73] Assignee: Kansai Paint Co., Ltd., Amagasaki, Japan

[21] Appl. No.: 379,032

[22] Filed: Jan. 27, 1995

Related U.S. Application Data

[62] Division of Ser. No. 122,364, Sep. 17, 1993, abandoned.

[30] Foreign Application Priority Data

Sep. 22, 1992 [JP] Japan ..................................... 4-276821

[51] Int. Cl.$^6$ ....................................................... B32B 3/00
[52] U.S. Cl. ........................... 428/200; 428/203; 428/204; 428/349; 428/354
[58] Field of Search .............................. 428/411.1, 423.1, 428/424.2, 515, 200, 203, 204, 349, 354; 524/529, 531, 535

[56] References Cited

U.S. PATENT DOCUMENTS

| 3,700,621 | 10/1972 | Burke, Jr. | 524/535 X |
| 3,814,720 | 6/1974 | Maker et al. | 524/535 X |
| 4,234,466 | 11/1980 | Takahashi et al. | 524/535 X |
| 4,427,823 | 1/1984 | Inagaki et al. | 524/531 X |
| 4,559,382 | 12/1985 | Martens et al. | 524/535 |
| 4,742,121 | 5/1988 | Toman | 524/531 X |
| 4,818,792 | 4/1989 | Martin et al. | 524/531 X |
| 4,988,759 | 1/1991 | Den Hartog et al. | 524/531 X |

*Primary Examiner*—Judy M. Reddick
*Attorney, Agent, or Firm*—Fisher, Christen & Sabol

[57] ABSTRACT

An actinic radiation-curable colored coating composition for use in vacuum forming film, containing, as the essential components, (A) a resin containing at least 0.1 of polymerizable unsaturated group per 1,000 of molecular weight and having a weight-average molecular weight of 2,000 to 300,000, (B) a coloring material and (C) an organic solvent, a colored coating layer obtained by coating or printing the colored coating composition, followed by removing the organic solvent therefrom prior to curing and comprising the components (A) and (B) being tack-free and heat-softening; a vacuum forming film therefrom; and a vacuum-formed product obtained therefrom.

1 Claim, 1 Drawing Sheet

ACTINIC RADIATION-CURABLE COLORED COATING COMPOSITION FOR USE IN VACUUM-FORMING FILM, VACUUM-FORMING FILM AND VACUUM-FORMED PRODUCT

This is a Division of prior U.S. application Ser. No. 08/122,364 Filing Date Sep. 17, 1993 now abandoned.

BACKGROUND OF THE INVENTION

(1) Field of the Invention

The present invention relates an actinic radiation-curable colored coating composition for use in a vacuum-forming film, the vacuum-forming film and a vacuum-formed product.

(2) Description of the Prior Art

In recent years, a method of applying a colored film by vacuum forming onto a member such as automobile parts in place of a method of coating a colored coating composition directly onto the member is being used in that the former has such advantages over the latter that the former makes it possible to form a colored layer having a uniform film thickness even to members with complicated shapes, and makes it possible to easily carry out printing of patterns, etc.

The above vacuum forming may be carried out, for example, as shown in FIGS. 1 and 2, by a process which comprises placing a colored film (2) for use in vacuum forming onto an upper face of a vacuum forming apparatus (6) provided with a heater (1) and a rest (4), followed by heating the colored film (2) at temperatures usually in the range of 100° C. to 150° C. by use of the heater (1) to be softened, and sucking a gas within the vacuum forming apparatus so that the colored film (2) may be adhered onto the surface of a member (3) to cover it.

There has been used in the art a colored film obtained by forming an adhesive layer on one side of a base film such as polyurethane film, polyester film or the like and by forming an acrylic polyol/polyisocyanate based metallic coating film layer on the other side of the base film.

However, the above colored film has such disadvantages that heating of the base film at such temperatures as to make possible vacuum forming causes to reduce elongation of the metallic coating film, resulting in causing coating film defects such as crazing, cracking and peeling on the metallic coating film after vacuum forming.

On the other hand, it is necessary for the metallic layer as the colored layer and a clear layer to cover the metallic layer to have about double the film thickness of the normal coating film in order to obtain a satisfactory elongation of the metallic coating film after fabricating. The application of the spray coating process for increasing the film thickness of the metallic layer and the clear layer as above mentioned uses a large amount of thinner, resulting in such disadvantages that the base film is impregnated with thinner and foaming takes place within the base film, the colored layer, the clear layer and the like during vacuum forming.

SUMMARY OF THE INVENTION

It is an object of the present invention to provide an actinic radiation-curable colored coating composition to be used for preparing a vacuum-forming film easy to handle, capable of being quickly adhered onto a molding and capable of providing a vacuum-formed film free of defects such as cracking, peeling, reduction in gloss, air entrainment and the like, and capable of being quickly cured; and to provide a vacuum-formed product obtained therefrom.

A first embodiment of the present invention provides an actinic radiation-curable colored coating composition for use in vacuum forming film (hereinafter may simply be referred to as a colored coating composition), containing, as the essential components, (A) a resin containing at least 0.1 of polymerizable unsaturated group per 1,000 of molecular weight and having a weight-average molecular weight of 2,000 to 300,000, (B) a coloring material and (C) an organic solvent, a colored coating layer obtained by coating or printing the colored coating composition, followed by removing the organic solvent therefrom prior to curing and comprising the components (A) and (B) being tack-free and heat-softening;

A second embodiment of the present invention provides a vacuum forming film formed by successively laminating an adhesive layer and the colored coating layer formed from the coating composition of the first embodiment of the present invention, preferably formed by successively laminating an adhesive layer, a base film layer, the colored coating layer formed from the coating composition of the first embodiment of the present invention, and a clear coating layer.

A third embodiment of the present invention provides a vacuum-formed product obtained by a process which comprises vacuum-forming the vacuum forming film of the second embodiment of the present invention onto a surface of a substrate and actinic radiation-curing the colored coating layer and if needed, the clear coating layer of the vacuum forming film.

DETAILED DESCRIPTION OF THE INVENTION

Figure 1:
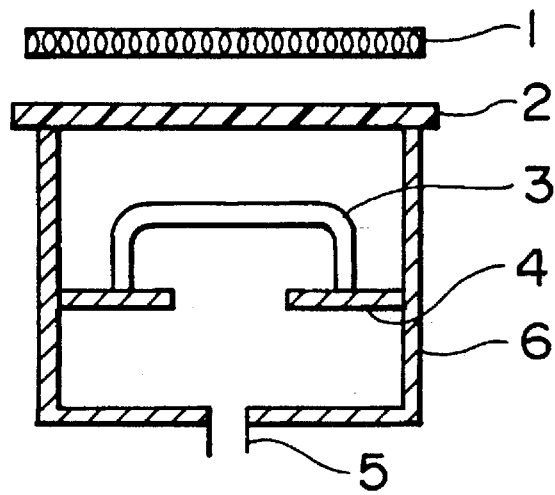
FIGS. 1–2 are explanatory cross sectional views showing an example of the application of the vacuum forming film of the present invention according to vacuum forming.

The resin (A) used in the colored coating composition of the present invention is a resin containing at least 0.1, preferably 0.1 to 4 of polymerizable unsaturated group per 1,000 of molecular weight and having a weight-average molecular weight of 2,000 to 300,000, preferably 3,000 to 100,000. When the number of the polymerizable unsaturated group is less than 0.1, curing of the surface of the cured film and solvent resistance thereof become poor. When the weight-average molecular weight is less than 2,000, the vacuum forming film obtained therefrom shows such disadvantages that viscosity of the colored coating layer is greatly reduced when heated and vacuum-formed and the vacuum forming film show defects such as sagging, resulting in that appearance of the vacuum-formed product becomes poor. On the other hand, when more than 300,000, solubility of the organic solvent to the resin (A) is reduced, resulting in that strage stability of the colored coating composition becomes poor and in that vacuum forming of the vacuum forming film obtained therefrom is made difficult.

Examples of the resin (A) may include thermoplastic resins such as (1) vinyl polymer having polymerizable unsaturated bond on side chain, (2) polyester or polyether having polymerizable unsaturated bond on side chain or terminal, (3) unsaturated polyester obtained by using an unsaturated polybasic acid as a major component of polybasic acid, (4) unsaturated epoxyester formed from unsaturated acid and epoxy resin, (5) polyurethane formed by using unsaturated acid or unsaturated alcohol as one component, (6) unsaturated bond-introduced melamine resin, (7) oil-modified alkyd resin and oil-modified amino-alkyd resin, (8) silicone-modified resin having polymerizable unsaturated bond, (9) fluorocarbon resin having polymerizable unsaturated bond, and the like.

Of these, the above vinyl polymer (1) has such advantages as to make possible to obtain a film advantageous from the standpoint of a balance between cost and film performances such as weather resistance, solvent resistance, hardness and the like.

The above vinyl polymer having polymerizable unsaturated group on side chain may include the following ① to ④.

① Adduct of epoxy group-containing vinyl polymer with acid monomer:

Examples of the epoxy group-containing vinyl polymer may include homopolymers of epoxy group-containing vinyl monomer such as glycidyl (meth)acrylate, 3,4-epoxy-cyclohexylmethyl (meth)acrylate and the like, copolymers thereof with other radical polymerizable unsaturated monomers, for example, (meth)acrylic acid $C_1$–$C_{22}$ alkyl ester monomers such as methyl (meth)acrylate, ethyl (meth)acrylate, propyl (meth)acrylate, butyl (meth)acrylate, hexyl (meth)acrylate, 2-ethylhexyl (meth)acrylate, laurel (meth)acrylate and the like; aromatic vinyl monomers such as styrene, $\alpha$-methyl styrene, vinyl toluene and the like; nitrile compounds such as (meth)acrylonitrile and the like; and the like.

Examples of the acid monomer may include (meth)acrylic acid, 2-carboxylthyl (meth)acrylate, (anhydrous) maleic acid and the like.

② Adduct of acid group-containing vinyl polymer with epoxy group-containing vinyl monomer:

Examples of the acid group-containing vinyl polymer may include homopolymers of the above acid monomer, copolymers of the above acid monomer with other radical polymerizable unsaturated monomer as above mentioned, and the like.

Examples of the epoxy group-containing monomer may include the same ones as above exemplified.

③ Adduct of hydroxyl group-containing vinyl polymer with isocyanate group-containing vinyl monomer:

Examples of the hydroxyl group-containing vinyl polymer may include homopolymers of hydroxyl group-containing vinyl monomer such as 2-hydroxyethyl (meth)acrylate, 2-hydroxypropyl (meth)acrylate and the like, and copolymers of the hydroxy group-containing vinyl monomer with other radical polymerizable unsaturated monomer as above mentioned, and the like.

Examples of the isocyanate group-containing vinyl monomer may include isocyanatoethyl acrylate, m-isopropenyl-$\alpha,\alpha$-dimethylbenzyl isocyanate, equimolar adduct of the hydroxyl group-containing vinyl monomer with isophorone diisocyanate, and the like.

④ Adduct of isocyanate group-containing vinyl polymer with hydroxyl group-containing vinyl monomer:

Examples of the isocyanate group-containing vinyl polymer may include homopolymers of isocyanate group-containing vinyl monomer, copolymers of isocyanate group-containing vinyl monomer with other radical polymerizable unsaturated monomer as above mentioned, and the like.

Examples of the hydroxyl group-containing vinyl monomer may include the same ones as above mentioned.

On the preparation of the above ① to ④, polymerization reaction of vinyl monomer, acid group-epoxy group addition reaction and hydroxyl group-isocyanate group addition reaction are all carried out by the conventional processes. For example, the polymerization reaction of vinyl monomer may be carried out by heating the vinyl monomer at about 80° C. to 140° C. for about 2 to 12 hours in the presence of a radical polymerization initiator such as peroxides, azo compound and the like in an organic solvent.

The addition reaction of the acid group with epoxy group may be carried out, for example, by reacting at room temperature or by heating at about 80° to 180° C. for about 1 to 10 hours, if needed, in the presence of a quaternary ammonium salt catalyst such as tetraethylammonium bromide.

The addition reaction of hydroxyl group and isocyanate group may be carried out, for example, by reacting at room temperature or by heating at about 40° to 100° C. for about 30 minutes to 2 hours, if needed, in the presence of a tin catalyst such as dibutyltindiacetate.

For the purpose of promoting crosslinking reaction, polyfunctional monomer and polyfunctional oligomer may be used in combination in such an amount that tack-free properties may not be reduced.

The coloring material (B) used in the colored coating composition of the present invention may include color pigments, dyes, fluorescent dyes, fluorescent pigments and the like. The above pigments and dyes may be arbitrarily selected for use from conventionally used ones. Of these the pigment is preferably used from the standpoint of weather-resistance. Examples of the color pigment may include inorganic pigments such as carbon black and titanium oxide; organic pigments, for example, quinacridone pigments such as quinacridone red pigment, azo-pigments such as pigment red, phthalocyanine pigments such as phthalocyanine blue and phthalocyanine green; flake metallic powders such as aluminum powder, copper powder, mica flake-like iron oxide powder, bronze powder, stainless steel powder and the like; and the like. The amount of the color pigment or dye to be used may vary depending on its own properties such as opacifying power, specific gravity and the like, but may be in the range of normally 0.5 to 300 parts by weight, preferably 3 to 150 parts by weight per 100 parts by weight of the resin solid content. In addition thereto, extender pigments such as barium sulfate, calcium carbonate, clay, zinc white, silica and the like may be used in combination therewith.

The organic solvent (C) used in the colored coating composition of the present invention may include an inactive organic solvent which is capable of dissolving or dispersing the above component (A) and which does not react with polymerizable unsaturated group of the component (A), and which is preferably an organic solvent having a boiling point of 220° C. or lower. Preferred examples of the inactive organic solvent used may include aliphatic hydrocarbons such as pentane, hexane, heptane and the like, aromatic hydrocarbons such as toluene, xylene and the like, ethers such as ethylene glycol diethyl ether and the like, ketones such as methyl ethyl ketone, methyl isobutyl ketone, acetone and the like, esters such as ethyl acetate, butyl acetate and the like, alcohols such as isopropyl alcohol, butyl alcohol, cellosolve, diethyleneglycol monoethyl ether and the like.

The above organic solvent may also include solvents used on synthesizing the above component (A) and solvents used on diluting the colored coating composition to a coating viscosity.

The organic solvent may desirably be used in such an amount that a solid content of the colored coating composition may be in the range of about 20 to 70% by weight, preferably 35 to 50% by weight. When the solid content is less than about 20% by weight, a cured film may show defects such as bubbling. On the other hand, when more than about 70% by weight, smoothness of the colored coating layer may undesirably become poor.

The colored coating composition of the present invention may be cured by irradiation of actinic radication such as electron beam, ultraviolet light and the like. When cured by irradiation of ultraviolet light, a photopolymerization initiator must be incorporated beforehand into the colored coating composition. The photopolymerization initiator used may include conventional ones to be activated on irradiation of ultraviolet light and to generate radicals. Examples of the photopolymerization initiator may include benzoin, benzoin methyl ether, benzoin ethyl ether, benzoin n-propyl ether, benzoin isopropyl ether, benzoin n-butyl ether, α-hydroxy-isobutylphenone, benzophenone, p-methylbenzophenone, Michler's ketone, 1-hydroxycyclohexylphenyl ketone, acetophenone, 1-hydroxy-1-cyclohexylacetophenone, 2,4-diethylthioxanthone, 2-chlorothioxanthone, anthraquinone, 2-methyl-anthraquinone, 2-methyl-1-[4-(methylthio)phenyl]-2-morpholinopropanone, phenyl disulfide, 2-nitrofluorene, and the like. The above photopolymerization initiator may be used alone or in combination, and in an amount of 0.1 to 10 parts by weight per 100 parts by weight of a sum of actinic radiation-curing resin and actinic radiation-curing vinyl monomer, i.e. a binder component.

For the purpose of promoting the photopolymerization reaction in the presence of the above photopolymerization initiator, a photosensitizer may be used in combination with the photopolymerization initiator. Examples of the photosensitizer to be used may include tertiary amines such as triethylamine, triethanolamine, 2-dimethylaminoethanol and the like; alkylphosphines such as triphenylphosphine; thioether such as β-thiodiglycol, and the like. The above photosensitizers may be used alone or in combination, and used in an amount of 0.1 to 10 parts by weight per 100 parts by weight of a binder component.

The colored coating composition of the present invention may contain, if needed, a slip agent, additives and solvents such as silicone based ones, fluorine based ones and the like, as well as pigments and saturated resins in such an amount that clearness of the cured and color-developed portions may not remarkably be damaged.

Examples of the slip agent may include conventionally used slip agents such as silicone based ones, fluorine based ones, polyethylene wax based ones, polypropylene wax based ones.

The colored coating composition of the present invention is such that a colored coating layer obtained by coating or printing the colored coating composition, followed by removing the organic solvent therefrom prior to curing and comprising component (A), component (B) and, if needed, additional component, is required to be tack-free and heat-softening. If not tack-free, handling becomes difficult. The above heat-softening properties mean that the colored coating layer is heat-softened to such extents that the colored coating layer does not show cracking when bent at an angle of 90° at vacuum forming temperatures, normally 100° to 150° C., and does not melt-flow.

The tack-free properties of the colored coating layer may be controlled by a glass transition temperature of the resin (A), an amount of the coloring material used, etc.

The vacuum forming film of the second embodiment of the present invention is a film formed by successively laminating an adhesive layer, if needed, a base film layer, colored coating layer, and, if needed, a clear layer.

The adhesive layer may not particularly be limited so long as it is softened and shows adhesive properties at vacuum forming temperatures. Examples of the adhesive used in the adhesive layer may include adhesives or self adhesives comprising resins such as ethylene-vinyl acetate resin, acrylic resin, vinyl resin, rubber and the like, as a major component. The adhesive layer may have a film thickness of normally about 10 to 100 μm.

A releasable sheet may, if needed, be prepared by treating a sheet comprising paper, plastics or the like with a release sheet such as silicone, wax and the like and laminated on one side of the adhesive layer. The releasable sheet is peeled and removed on vacuum forming.

The base film layer may include conventionally used thermoplastic plastic films, so long as they are softened by heating and do not produce problems such as crazing, cracking, breaking and the like during vacuum forming. Specific examples of the base film layer may include ones respectively comprising polyvinyl chloride resin, ABS resin, polyester resin, polyurethane resin, polypropylene, polyethylene and the like. The base film layer has a film thickness of normally about 0.1 to 0.5 mm.

The colored coating layer is a layer formed from the colored coating composition and free of the organic solvent component (C).

The colored coating layer may be formed by coating or printing the above colored coating composition on the surface of the adhesive layer or the base film layer according to a coating method such as roll coating, spraying, knife coating, curtain flow coating and the like, or a printing method such as silk screen printing, gravure printing and the like to a dry film thickness of about 10 to 100 μm, preferably about 30 to 80 μm, followed by drying.

Drying may be carried out at room temperature or by heating at about 60° to 90° C. for about 30 to 60 minutes.

The clear layer may preferably be formed on the surface of a metallic coating layer formed from a colored coating composition containing metallic powder as the pigment. The clear layer may be formed by use of a clear coating composition comprising a transparent mixture of the resin (A) and the organic solvent (C) used in the colored coating composition, or comprising a mixture of the transparent mixture with the coloring material (B) in such an amount that the undercoated colored coating layer is not hidden. The clear layer may be formed by coating in the same coating method as in the colored coating composition to a dry film thickness of about 40 to 200 μm, preferably about 50 to 100 μm, followed by drying.

The vacuum forming process by applying the colored film of the present invention to a member may include conventionally used ones, and specifically may include one described with reference to FIGS. 1–2 as above. The above member may include ones made of various materials. Specific examples of various materials constituting the member may include plastics such as polyurethane, polyamide, reinforced plastic, phenol resin, polyvinyl chloride, polyethylene and the like, woods metals, and the like.

According to the third embodiment of the present invention, the vacuum forming film is vaccum-formed onto a member as the substrate, followed by irradiating an actinic radiation such as electron beam or ultraviolet hight onto the vacuum forming film to cure the colored coating layer and the clear layer used when needed.

The electron beam accelerator to be used as an electron beam source may be of Cockcroft type, Cockcroft-Wallon type, Van de Graaff type, resonance transformer type, transformer type, insulated core transformer type, dynamitron type, linear filament type, broad beam type, ion plasma type, high frequency type or the like. The irradiation conditions of the electron beam may vary depending on film thickness, etc., but normally are such that an irradiation dose is in the range of 1 to 20 Mrad.

Examples of the ultraviolet light source to be used may include highpressure mercury lamp, ultra-high pressure mercury lamp, xenon lamp, carbon arc lamp, metal halide lamp, solar light and the like. The irradiation conditions of ultraviolet light are not pasticularly limited, but preferably are such that a light containing ultraviolet light in the range of 150 to 450 nm may be irradiated in a dose of 50 to 2,000 mj/cm$^2$ under an atmosphere of air or an inert gas.

The vacuum forming film formed from the colored coating composition of the present invention is tack-free by itself and easy to handle, capable of being quickly adhered onto a molding due to its heat-softening properties, capable of providing a vacuum-formed film free of defects such as cracking, peeling, reduction in glass, air entrainment and the like, and capable of being cured in a very short period of time by the actinic radiation to obtain a cured film having excellent performances.

EXAMPLE

The present invention will be explained more in detail by the following Examples, in which "part" and "%" are all by weight.
Preparation of Resin 1

Preparation Example 1

Formulation 1:

| methyl methacrylate | 20 parts |
| n-butyl methacrylate | 26 parts |
| 2-hydroxypropyl acrylate | 20 parts |
| 3,4-epoxycyclohexylmethyl acrylate | 34 parts |
| 2,2'-azobisisobutyromitrile | 2 parts |

Into a flask were charged 50 parts of toluene and 50 parts of n-butyl acetate and the mixed solvent was heated to 110° C., followed by dropping 102 parts of the above formulation 1 over 3 hours, and by keeping for 5 hours to obtain an epoxy group-containing acrylic resin solution. Next, into 202 parts of the above resin solution were added 13 parts of acrylic acid, 0.5 part of tetraethylammonium bromide and 0.1 part of hydroquinone to carry out addition reaction at 110° C. for 5 hours while blowing air thereinto. After the completion of the reaction, 13 parts of toluene was added to obtain an ethylenically unsaturated group-containing acrylic resin (Resin 1) having a solid content of about 50%. The above resin had a weight-average molecular weight of about 32,000 and contained 1.6 of the unsaturated group per 1000 of the molecular weight (hereinafter referred to as the saturated group).
Preparation of Resin 2

Preparation Example 2

Formulation 2:

| methyl methacrylate | 10 parts |
| n-butyl acrylate | 30 parts |
| acrylic acid | 60 parts |
| t-butylperoxyoctoate | 8 parts |

Into a flask was charged 100 parts of isobutyl acetate and the solvent was heated to 115° C., followed by dropping 108 parts of the above formulation 2 over 3 hours, and keeping for 6 hours to obtain a carboxyl group-containing acrylic resin solution. Next, into 208 parts of the above resin solution were added 118 parts of glycidyl methacrylate, 0.7 part of tetraethylammonium bromide and 0.1 part of hydroquinone to carry out addition reaction at 110° C. for 5 hours while blowing air thereinto. After the completion of the reaction, 118 parts of isobutyl acetate was added to obtain an ethylenically unsaturated group-containing acrylic resin (Resin 2) having a solid content of about 50%. The above resin had a weight-average molecular weight of about 10,000 and contained 3.6 of the unsaturated group.
Preparation of resin 3

Preparation example 3

Formulation 3:

| styrene | 10 parts |
| methyl methacrylate | 25 parts |
| n-butyl acrylate | 50 parts |
| 2-hydroxyethyl acrylate | 15 parts |
| 2,2'-azobisisobutyronitrile | 5 parts |

Into a flask was charged 100 parts of methyl isobutyl ketone and the solvent was heated to 115° C., followed by dropping 108 parts of the above formulation 3 over 3 hours, and keeping for 5 hours to obtain a hydroxyl group-containing acrylic resin solution. Separately, 222 parts of isophorone diisocyanate was charged into another flask, followed by heating at 80° C., dropping 116 parts of 2-hydroxyethyl acrylate over 2 hours, and keeping for 4 hours to obtain a diisocyanate group-containing monomer. Into 205 parts of the above hydroxyl group-containing acrylic resin solution were added 35 parts of the above isocyanate group-containing monomer, 0.1 part of hydroquinone and 0.02 part of dibutyltindiacetate to carry out addition reaction at 80° C. for 5 hours while flowing air thereinto. After the completion of the reaction, 35 parts of methyl isobutyl ketone was added to obtain an ethylenically unsaturated group-containing acrylic resin (Resin 3) having a solid content of about 50%. The above resin had a weight-average molecular weight of 12,000 and 0.7 of the unsaturated group.
Preparation of Resin 4

Preparation Example 4

Formulation 4:

| methyl methacrylate | 30 parts |
| 2-ethylhexyl acrylate | 45 parts |
| isocyanate ethyl methacrylate | 25 parts |
| 2,2'-azobisisobutyronitrile | 3 parts |

Into a flask was charged 100 parts of methyl isobutyl ketone and the solvent was heated to 115° C., followed by dropping 103 parts of the above formulation 4 over 3 hours, and keeping for 5 hours to obtain an isocyanate group-containing acrylic resin solution. Next, into 203 parts of the above resin solution were added 21 parts of 2-hydroxyethyl methacrylate, 0.1 part of hydroquinone and 0.01 part of dibutyltindiacetate to carry out addition reaction at 80° C. for 5 hours while blowing air thereinto. After the completion of the reaction, 21 parts of methyl isobutyl ketone was added to obtain an ethylenically unsaturated group-containing acrylic resin (Resin 4) having a solid content of about 50%. The above resin had a weight-average molecular weight of 18,000 and contained 1.3 of the unsaturated group.
Preparations of Colored Coating Compositions (a)–(d)

Preparation Examples 5–8

Colored coating compositions (a)–(d) were prepared according to the formulations shown in Table 1 respectively.
Preparation of Comparative Colored Coating Composition (e)

Comparative Preparation Example 1

A comparative colored coating composition (e) was prepared by formulating Retan PG80 Metallic Base (trademark of acrylic polyol marketed by Kansai Paint Co., Ltd.) and Retan PG (trademark of polyisocyanate marketed by Kansai Paint Co., Ltd.) curing agent in such amounts that NCO/OH ratio may be about 1.0.
Preparation of Clear Coating Compositions ①–③

Preparation Examples 9–11

Clear coating compositions ①–③ were prepared according to the formulations shown in Table 1 respectively.
Preparation of Comparative Clear Coating Composition ④

Comparative Preparation Example 2

A comparative clear coating composition ④ was prepared by formulating Retan PG80 Quartz Clear Z (trademark of acrylic polyol marketed by Kansai Paint Co., Ltd.) and Retan PG (trademark of polyisocyanate marketed by Kansai Paint Co., Ltd.) curing agent in such amounts that NCO/OH ratio may be about 1.0.

TABLE 1

|  | Colored coating composition | | | | Clear coating composition | | |
| --- | --- | --- | --- | --- | --- | --- | --- |
|  | a | b | c | d | ① | ② | ③ |
| Formulation (based on solid content) | | | | | | | |
| Resin | | | | | | | |
| Kind | 1 | 2 | 3 | 4 | 1 | 2 | 3 |
| Amount (part) | 100 | 100 | 100 | 100 | 100 | 100 | 100 |
| Pigment (*1) | | | | | | | |
| Aluminum paste (part) | 25 | 25 | 25 | — | — | — | — |
| Titanium white (part) | — | — | — | 80 | — | — | — |
| Additive (part) (*2) | 30 | 30 | 30 | — | 5 | 5 | 5 |
| Ultraviolet light absorber (part) (*3) | — | — | — | — | 2 | 2 | — |
| Photopolymerization initiator (part) (*4) | — | — | — | — | — | — | 2 |
| Solid content (%) (*5) | 49 | 49 | 49 | 50 | 51 | 51 | 51 |

Pigment (*1): Aluminium paste (Alpaste 7620NS, Trade name, marketed by Toyo Aluminium Co., Ltd., solid content: 65%); Titanium white (Tipaque CR-93, trade name, marketed by Ishihara Sangyo Kaisha, Ltd.)
Additive (*2): CAB-551-02, Trade name, marketed by Eastman Chemicals Industries.
Ultraviolet light absorber (*3): Tinuvin-900 (Trademark, marketed by Ciba Geigy A.G.)
Photopolymerization initiator (*4): Irgacure 184, Trade name, marketed by Ciba Geigy A.G.
Solid content (%) (*5): Solid content (%) when controlled to knife coater coating viscosity.

Example 1

A base film layer ① (ABS resin, film thickness: 250 μm) was laminated onto an adhesive layer ① (acrylic heat-sensitive adhesive, film thickness: 20 μm) to form a substrate. The colored coating composition (a) was coated to be a dry film thickness of 40 μm by a knife coater onto a surface of the base film layer ① constituting the substrate, followed by heating at 80° C. for 60 minutes to evaporate the solvent and to form a colored coating layer.

Next, the clear coating composition ① was coated to be a dry film thickness of 80 μm by a knife coater onto the surface of the colored coating layer, followed by heating at 80° C. for 60 minutes to evaporate the solvent and to form a clear coating layer, resulting in forming a laminate film consisting of the adhesive layer, the base film layer, the colored coating layer and the clear coating layer successively laminated.

Figure 2:
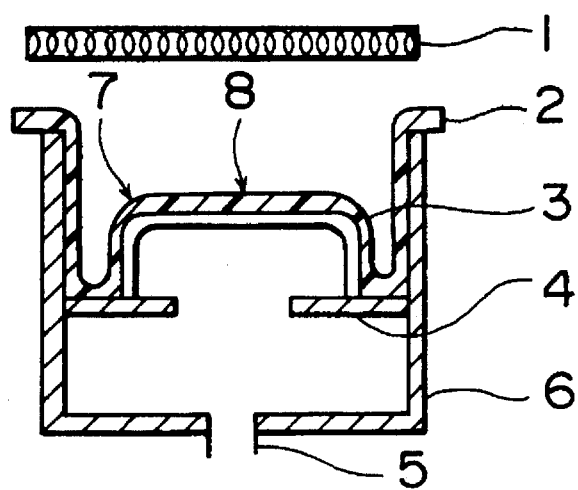

The laminate film was subjected to vacuum forming by use of a vacuum forming apparatus shown in FIGS. 1–2. That is, the laminate film 2 was held in place on the vacuum forming apparatus 6 equipped with heater 1 and trestle 4 as shown in FIG. 1, followed by heating at 140° C. by heater 1 to be softened, sucking air within the apparatus a vacuum hole 5 so that the laminate film may be adhered and coated onto the surface of a member 3 to obtain a vacuum-formed product as shown in FIG. 2. An automobile member of a conical steel material having a depth of 7 cm and a diameter of 15 cm was used as the member 3.

Next, a vacuum-formed film on the vacuum-formed product was aired by irradiation of electron beam in an irradiation dose of 8 Mred (hereinafter referred to as curing condition ① as shown in Table 2).

Examples 2–4

Laminate films and vacuum-formed products were prepared in the same manner as in Example 1 under the conditions shown in Table 2 respectively. In Table 2, curing condition ② is such that ultraviolet light was irradiated in a dose of 400 mj/cm² by use of a high-pressure mercury lamp.

Comparative Example 1

A comparative laminate film and vacuum-formed product were prepared in the same manner as in Example 1 under the conditions shown in Table 2. The results are shown in Table 2.
Explanation of Table 2
Releasable sheet:

Silicone-treated releasable sheet.
Adhesive layer:

① acrylic heat-sensitive adhesive (film thickness: 20 μm)

② acrylic pressure-sensitive adhesive (film thickness: 20 μm)
Base film layer:

① acrylonitrile-butadiene-styrene resin (film thickness: 250 μm)

② polyvinyl chloride resin (film thickness: 200 μm)

③ polypropylene (film thickness: 200 μm) treated with an anchor coating film agent for polypropylene
Tack-free properties of film surface:

It was evaluated by softly pressing the surface of the film with the finger. Measurement was carried out at 20° C. Evaluation was made as follows:

5—Showing no tackiness; 3—Showing little tackiness; 1—Showing tackiness.

Film performances prior to curing:

After vacuum forming, comparison was made between an area where no elongation of the film develops as shown by 8 in FIG. 2 and an area where maximum elongation of the film develops as shown by 7 in FIG. 2 to be an elongation of 200%.

Crack resistance:

The film surface was evaluated by the maked eye as follows.

5—No changes are observed; 3—some cracking developed in the area where the elongation of the film is high; 1—marked cracking developed in an area where the elongation of the film is high.

Metallic feeling:

The film surface was evaluated by the maked eye as follows.

5—No changes were observed; 3—metallic feeding becomes slightly poor in the area where the elongation of the film is high; 1—methallic feeding becomes poor in the area where the elongation of the film is high.

Gloss:

The film surface was evaluated by the maked eye as follows.

5—No change is observed; 3—gloss is reduced in the area where the elongation of the film is high;

1—gloss is greatly reduced where the elongation of the film is high.

Film performances after curing were evaluated as follows.

Crack reinstance; methallic feeling and gloss were evaluated in the same manner as the above.

Solvent resistance:

The film surface was strongly rubbed with a cloth impregnated with xylene reciprocally 10 times, and reduction in gloss of the film surface was than evaluated as follows.

5—No reduction in gloss was observed;

3—flashing was observed; 1—remarkable reduction in gloss was observed.

Appearance:

Existence of defects such as bubbling, peeling between the member and the film, and air entrainment was evaluated by the maked eye as follows.

5—No defects were observed; 3—some defects were observed; 1—many defects were observed.

Weather resistance:

Gloss retension and color difference ($\Delta E^*$ ab. JIS Z8730) after 2,000 hours exposure to Sunshine Weather-O-meter were determined respectively.

Adhesion:

Adhesion between an automobile member and maximum extended area of the film was examined and evaluated by adhesion test with squares as follows.

5—No peeling was observed to be good; 3—peeled off by a strong power; 1—peeled off by a weak power.

TABLE 2

|  | Example | | | | Comparative Ex. 1 |
| --- | --- | --- | --- | --- | --- |
|  | 1 | 2 | 3 | 4 | |
| Construction and preparation conditions of the film | | | | | |
| Releasable sheet | — | used | — | — | — |
| Adhesive layer | ① | ② | ① | ① | ① |
| Base film layer | ① | ① | ② | ③ | ① |
| Colored coating layer | | | | | |
| Colored coating composition | a | b | c | d | e |
| Drying conditions | 80° C. - 60 min. | | | | |
| Dry film thickness (μm) | 40 | 40 | 40 | 50 | 40 |
| Clear coating layer | | | | | |
| Clear coating composition | ① | ② | ③ | — | ⑤ |
| Curing condition | 80° C. - 60 min | | | — | 80° C. - 60 min. |
| Dry film thickness (μm) | 80 | 80 | 50 | — | 80 |
| Tack-free properties of film surface | 5 | 5 | 5 | 5 | 5 |
| Vacuum forming conditions | 140° C. | | | | |
| Film performances | | | | | |
| Film performances prior to curing | | | | | |
| Crack resistance | 5 | 5 | 5 | 5 | — |
| Metallic feeling | 5 | 5 | 5 | — | — |
| Gloss | 5 | 5 | 5 | 5 | — |
| Curing conditions | ① | ① | ② | ② | — |
| Appearance | 5 | 5 | 5 | 5 | 3 |
| Crack resistance | 5 | 5 | 5 | 5 | 1 |
| Metallic feeling | 5 | 5 | 5 | — | 3 |
| Gloss | 5 | 5 | 5 | 5 | 1 |
| Solvent resistance | 5 | 5 | 5 | 5 | 5 |
| Weather resistance (gloss retention/ $\Delta E^+$ ab) | 90/ 2.0 | 90/ 3.0 | 85/ 3.0 | 84/ 2.0 | 75/ 4.0 |
| Adhesion | 5 | 5 | 5 | 5 | 3 |

What is claimed is:

1. A laminate film for vacuum forming a vacuum-formed product, said laminate film being formed by a process which comprises laminating a base film layer onto an adhesive layer to form a substrate, coating or printing an actinic radiation-curable colored coating composition containing, as the essential components, (A) an ethylenically unsaturated group-containing acrylic resin containing 0.1 to 0.4 of polymerizable unsaturated group per 1,000 units of molecular weight and having a weight-average molecular weight of 2,000 to 300,000, (B) a coloring material selected from the group consisting of color pigments, dyes, fluorescent dyes and fluorescent pigments, and (C) an organic solvent capable of dissolving or dispersing the acrylic resin (A) and having a boiling point of 220° C. or lower, onto the surface of the base film layer, followed by evaporating the organic solvent to form a colored coating or printing layer, and coating a clear coating composition consisting of the acrylic resin (A) and the organic solvent (C) onto the surface of the colored coating or printing layer, followed by evaporating the organic solvent to form a clear coating layer, and consisting of the adhesive layer, the base film layer, the colored coating or printing layer and the clear coating layer, said coloring material (B) being contained in an amount of 0.5 to 150 parts by weight per 100 parts by weight of the acrylic resin (A), the adhesive layer and the base film layer being heat-softening when heated on vacuum forming, the colored coating or printing layer and the clear coating layer being tack-free and heat-softening when heated on vacuum forming.

* * * * *